Oct. 30, 1928.
W. H. SPIRE
DRAG LINK
Filed Nov. 4, 1921
1,689,215
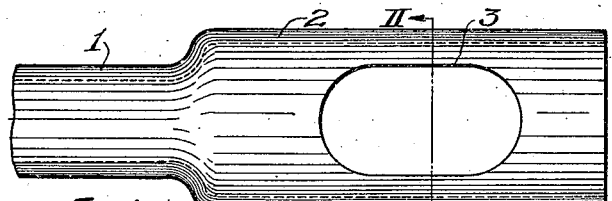
Fig. 1.
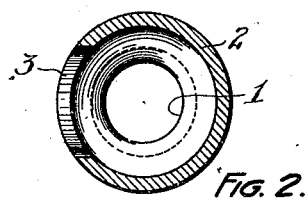
Fig. 2.
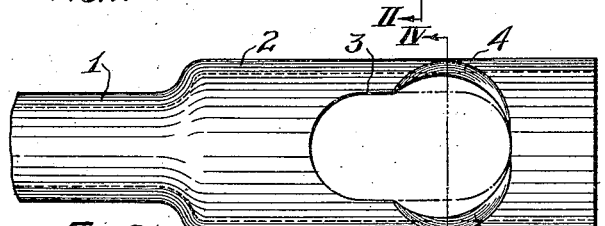
Fig. 3.
Fig. 4.
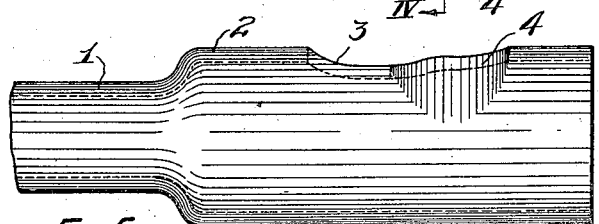
Fig. 5.
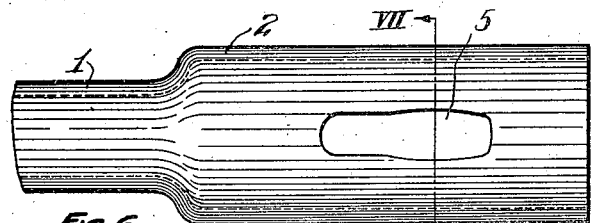
Fig. 6.
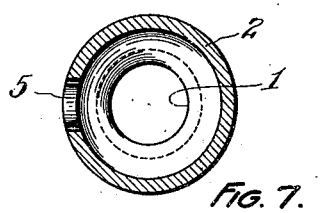
Fig. 7.
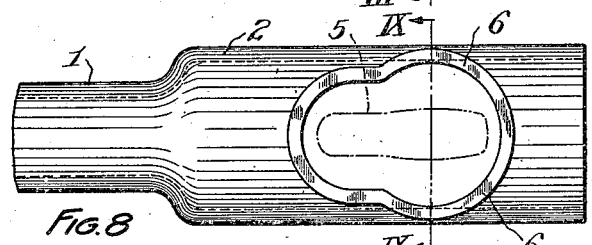
Fig. 8.
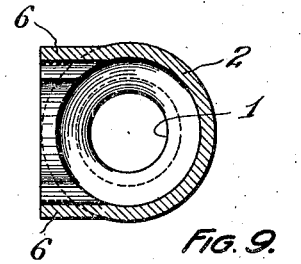
Fig. 9.
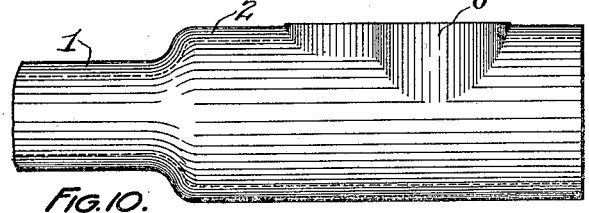
Fig. 10.
INVENTOR
WILLIAM H. SPIRE
BY
ATTORNEY Patented Oct. 30, 1928.

1,689,215

UNITED STATES PATENT OFFICE.

WILLIAM H. SPIRE, OF CLEVELAND, OHIO, ASSIGNOR TO THOMPSON PRODUCTS, INCORPORATED, OF CLEVELAND, OHIO, A CORPORATION OF OHIO.

DRAG LINK.

Application filed November 4, 1921. Serial No. 512,733.

My invention relates to drag links for use as a part of the steering mechanism of automobiles, and to the method of forming the ball receiving keyhole slot therein. The objects of my invention are to design a drag link which is reinforced at the portions thereof normally weakened by the ball receiving slot, and to provide a method of manufacture in which the reinforcements are provided in the slot forming operation.

The annexed drawings and the following description set forth in detail one embodiment of my improved drag link structure, and certain steps exemplifying my improved method, the disclosed means and steps, however, constituting but one of the various mechanical forms in which the principle of the invention may be employed or but one of the various ways in which the same may be carried out.

In said annexed drawings:

Fig. 1 is a plan view of the tubular drag link showing the slot initially formed in the tubing.

Fig. 2 is a section on line II—II of Fig. 1.

Fig. 3 is a plan view of the completed link.

Fig. 4 is a section on line IV—IV of Fig. 3.

Fig. 5 is a side elevation of the completed link.

Figs. 6 to 10 inclusive show a modified form of link.

Fig. 6 is a plan view of the tubular drag link showing the slot which is initially formed therein.

Fig. 7 is a section on line VII—VII of Fig. 6.

Fig. 8 is a plan view of the completed link.

Fig. 9 is a section on line IX—IX of Fig. 8.

Fig. 10 is a side elevation of the completed link.

Referring to the annexed drawings, in which the same numerals refer respectively to the same parts in the several views, my improved drag link comprises a piece of steel tubing 1 which has been upset and expanded in a forging machine so as to form the end sockets 2 having an outside diameter materially greater than the original tubing 1. In drag links of the type herein disclosed a keyhole slot is formed in the enlarged portion 2 to permit the insertion of the ball end of the connecting arm. The enlarged portion of this slot is of substantially the same diameter as the inner diameter of the enlarged portion 2. The cutting of such a large aperture in the cylindrical wall of the link materially weakens the link at this point since the cut extends through nearly half the circumference. In forming the slot by my improved method I first cut, by means of a suitable punch, a slot 3 of substantially uniform width throughout. I then expand a portion of the slot by means of a suitable forming die which engages the metal at the edge of the slot and bends the wall of the tube outwardly at the side edges of the slot forming arcuate flanges 4 whose inner surfaces form segments of a cylinder the axis of which is at right angles to the axis of the tube 1. The expanded portion of the slot 3 is thus widened to substantially the inner diameter of the enlarged portion 2 without cutting away the wall of the link more than necessary for the narrow portion of the slot, and the link is effectively reinforced by the flanges 4 at the point which in prior structures is the point of greatest weakness.

In the slightly modified form shown in Figs. 6 to 10 inclusive, I punch out in the first operation a much narrower slot 5 which is slightly enlarged at the end which is to form the ball entering portion. The edge of the slot is then turned up throughout the entire extent thereof to form a slot of the desired contour and size. The original slot 5 is so formed that when the forming operation is completed the edge of the marginal flange 6 surrounding the finished slot will lie substantially in a plane tangential to the outer surface of the cylindrical end 2 of the link.

It will be noted that by constructing the drag-link socket as above described, a reinforcement is provided without increasing the gauge of the metal comprising such socket. While such gauge is not increased the transverse dimension of the socket adjacent to the openings is increased, as is clearly shown in Figs. 4 and 9. This increase, therefore, provides additional resistance to bending moments applied to the socket and hence forms the desirable reinforcement.

What I claim is:

1. A drag link member comprising a cylindrical socket portion of substantially uniform gauge throughout, a keyhole slot in the wall thereof bounded by an upstanding peripheral flange of substantially the same gauge as the body of the socket portion, the end of the flange lying in a plane surface.

2. A drag link member comprising a cylindrical socket portion of substantially uniform gauge throughout, a keyhole slot forming a circular entrance aperture in the wall of said portion, the said aperture being bounded by a flange of cylindrical curvature and of substantially the same gauge as the body of the socket portion.

3. A drag link member comprising a cylindrical socket portion of substantially uniform gauge throughout, a keyhole slot in the wall thereof bounded by an upstanding peripheral flange of substantially the same gauge as the body of the socket portion, the maximum opening of the slot being of substantially the same diameter as the inside of the socket portion, whereby the material of the flange, on a section through the center of the maximum opening, taken at right angles to the axes of the socket, is substantially tangential to the inner cylindrical surface of the socket.

Signed by me this 19th day of October, 1921.

WILLIAM H. SPIRE.